(12) United States Patent
Lee et al.

(10) Patent No.: US 8,115,898 B2
(45) Date of Patent: Feb. 14, 2012

(54) LIQUID CRYSTAL DISPLAY (75) Inventors: Seong-Nam Lee, Seoul (KR);
Nam-Seok Lee, Suwon-si (KR);
Jeong-Uk Heo, Sungnam-si (KR);
Kyong-Ok Park, Bucheon-si (KR);
Sung-Hwan Hong, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 441 days.

(21) Appl. No.: 12/472,796

(22) Filed: May 27, 2009

(65) Prior Publication Data
US 2010/0103365 A1  Apr. 29, 2010

(30) Foreign Application Priority Data

Oct. 29, 2008  (KR) .................. 10-2008-0106531

(51) Int. Cl.
*C09K 19/02* (2006.01)
(52) U.S. Cl. ............... 349/182; 349/186; 252/299.01
(58) Field of Classification Search .............. None
See application file for complete search history.

(56) References Cited

U.S. PATENT DOCUMENTS 6,468,443 B1 * 10/2002 Wu ..................... 252/299.5
2011/0075074 A1 * 3/2011 Gauza et al. ................ 349/96

FOREIGN PATENT DOCUMENTS

| JP | 07-104320 | 4/1995 |
| JP | 2000-214421 | 8/2000 |
| KR | 1020020042455 A | 6/2002 |

* cited by examiner

*Primary Examiner* — Hemang Sanghavi
(74) *Attorney, Agent, or Firm* — Cantor Colburn LLP (57) ABSTRACT A liquid crystal display (LCD) which can be driven at a low voltage and has a fast response time. The LCD includes a liquid crystal composition interposed between a first substrate and a second substrate, wherein the liquid crystal composition includes a first polar liquid crystal compound and a second polar liquid crystal compound, each in an amount of 20% or less by weight based on a weight of the liquid crystal composition, wherein the first polar liquid crystal compound is represented by

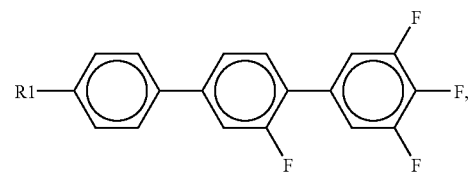

and the second polar liquid crystal compound is represented by at least one of

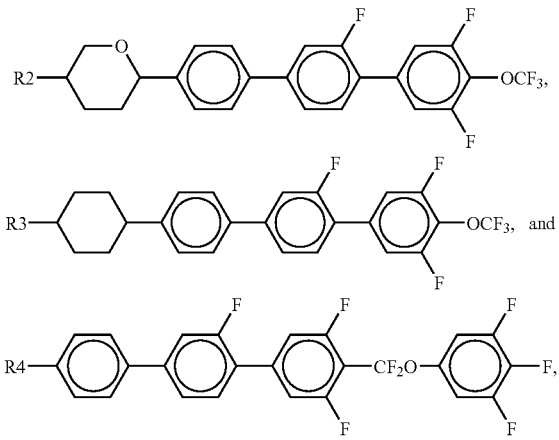

where each of R1, R2, and R3, and R4 independently is an alkyl group, an alkoxy group, or an alkenyl group having about 2 to about 15 carbon atoms.

10 Claims, 3 Drawing Sheets

LIQUID CRYSTAL DISPLAY

This application claims priority to Korean Patent Application No. 10-2008-0106531, filed on Oct. 29, 2008, and all benefits accruing therefrom under 35 U.S.C. §119, the contents of which in its entirety are herein incorporated by reference.

BACKGROUND OF THE INVENTION

1. Field of the Invention

The present invention relates to a liquid crystal composition and a liquid crystal display (LCD) using the same, and more particularly, to a twisted nematic (TN)-mode liquid crystal composition and an LCD using the same.

2. Description of the Related Art

Liquid crystal displays ("LCDs") are one of the most widely used types of flat panel displays. Generally, an LCD includes a pair of display panels having electrodes and a liquid crystal layer interposed between the display panels. In an LCD, voltages are applied to electrodes to generate an electric field. Accordingly, the alignment of liquid crystal molecules in the liquid crystal layer is determined, and the polarization of incident light is controlled. This results in a desired image being displayed on the LCD.

LCDs may be classified into twisted nematic ("TN") mode LCDs, in-plane switching ("IPS") mode LCDs, and vertically aligned ("VA") mode LCDs depending upon the alignment of liquid crystal molecules in the liquid crystal layer.

Recently, efforts have been made to optimize various characteristics of LCDs. These involve developing large, slim, and light LCDs having a high density and precision, a high contrast ratio ("CR"), a high transmittance, a wide viewing angle, and low power consumption. However, larger LCDs with high density and precision consume more power and thus have problems that involve the generation of excessive heat.

Liquid crystals used in conventional monitors have a TN structure and positive dielectric anisotropy. Generally, the liquid crystals are driven at a voltage of 6 volts ("V") or less (12 V or less in the case of AVDD).

TN mode LCDs having a high aperture ratio and a structure capable of facilitating the transmittance of light generally consume more power than the other aforementioned LCD modes and thus suffer from a problem of heat generation resulting from temperature rises caused by the driving of integrated circuits (ICs).

The present invention aims to address these drawbacks (i.e., increased power consumption and heat generation caused by the driving of ICs) of the high aperture ratio and transmittance structure. Furthermore, the present invention aims to provide an LCD, which can be driven at a low voltage and has a fast response time.

SUMMARY OF THE INVENTION

Aspects of the present invention provide a liquid crystal display (LCD), which can be driven at a low voltage and has a fast response time.

According to one aspect of the present invention, there is provided an LCD including a first display panel; a second display panel; the second display panel being separated from the first display panel and facing the first display panel; and a liquid crystal composition interposed between the first display panel and the second display panel, wherein the liquid crystal composition includes a first polar liquid crystal compound and a second polar liquid crystal compound, each in an amount of about 20% or less by weight based on a weight of the liquid crystal composition, wherein the first polar liquid crystal compound is represented by and the second polar liquid crystal compound is represented by at least one of where each of R1, R2, and R3, and R4 independently is an alkyl group, an alkoxy group, or an alkenyl group having about 2 to about 15 carbon atoms.

According to another aspect of the present invention, there is provided an LCD including a first substrate; a pixel electrode formed in a pixel region defined by a gate line and a data line intersecting each other on the first substrate; a storage electrode overlapping the pixel electrode to form a storage capacitor; a second substrate; the second substrate being separated from the first substrate and facing the first substrate; and a liquid crystal composition being interposed between the first substrate and the second substrate, wherein the liquid crystal composition includes a first polar liquid crystal compound and a second polar liquid crystal compound, each in an amount of about 20% or less by weight based on a weight of the liquid crystal composition, and the storage electrode is overlapped by the data line to be parallel to the data line and is wider than the data line, wherein the first polar liquid crystal compound is represented by and the second polar liquid crystal compound is represented by at least one of where each of R1, R2, and R3, and R4 independently is an alkyl group, an alkoxy group, or an alkenyl group having about 2 to about 15 carbon atoms.

BRIEF DESCRIPTION OF THE DRAWINGS

The above and other aspects, advantages and features of the invention will become more apparent by describing in further detail exemplary embodiments thereof with reference to the attached drawings, in which.

DETAILED DESCRIPTION OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein Rather, these embodiments are provided so that this disclosure will be thorough and complete and will fully convey the concept of the invention to those skilled in the art, and the present invention will only be defined by the appended claims. Like reference numerals refer to like elements throughout the specification.

Aspects, advantages, and features of exemplary embodiments of the invention and methods of accomplishing the same may be understood more readily by reference to the following detailed description of embodiments and the accompanying drawings. The exemplary embodiments of the invention may, however, may be embodied in many different forms, and should not be construed as being limited to the embodiments set forth herein. Rather, these embodiments are provided so that this disclosure will be thorough and complete and will fully convey the concept of the invention to those skilled in the art, and the exemplary embodiments of the invention will only be defined by the appended claims. Like reference numerals refer to like elements throughout the specification.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., can be used herein to describe various elements, components, regions, layers and/or sections, these elements, components, regions, layers and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the exemplary embodiments of the invention.

Spatially relative terms, such as "below," "lower," "upper" and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device can be otherwise oriented (rotated 90 degrees or at other orientations) and the spatially relative descriptors used herein interpreted accordingly.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation can result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, a liquid crystal display (LCD) according to embodiments of the present invention will be described in detail.

Figure 1:
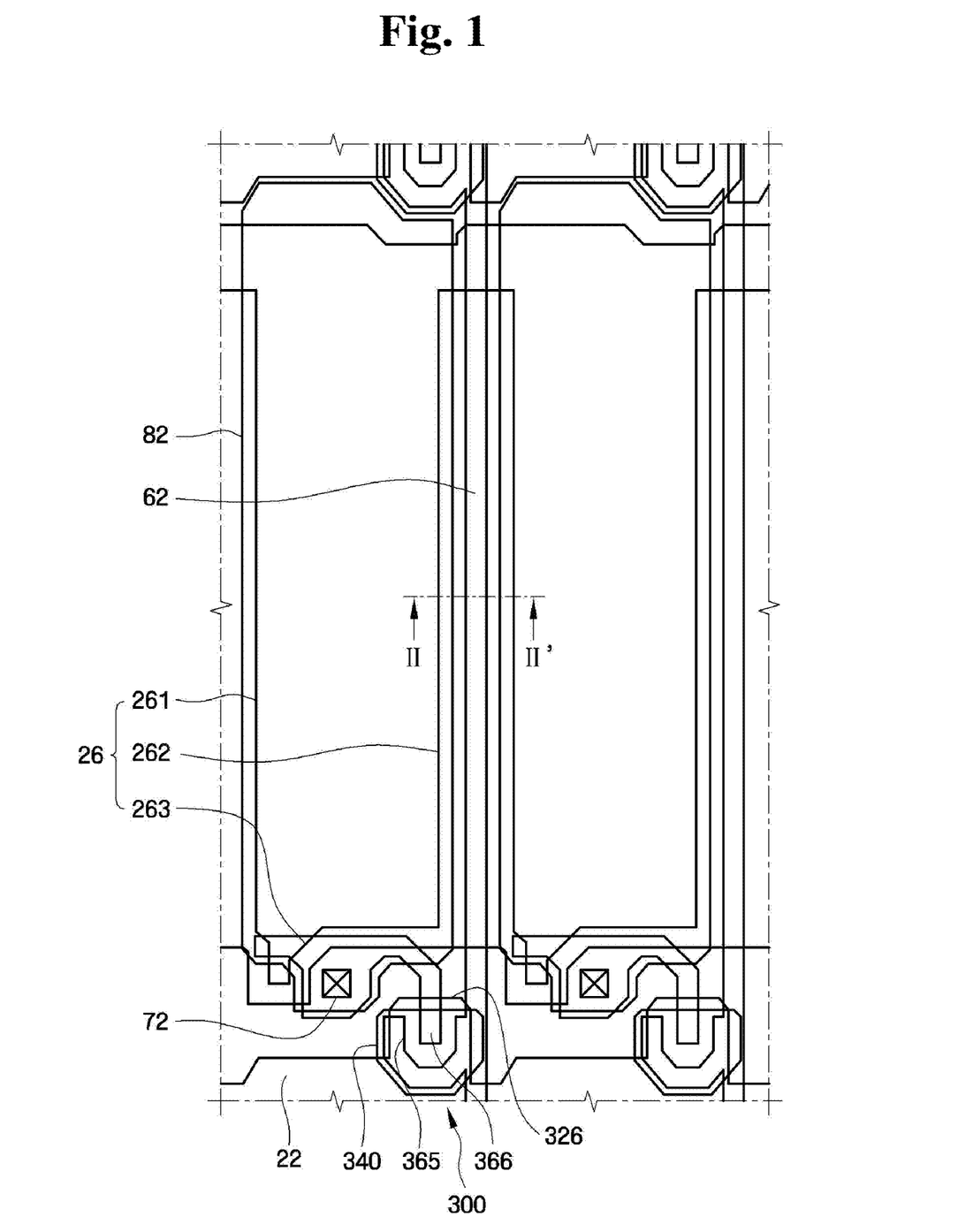
FIG. 1 is an exemplary schematic diagram of a liquid crystal display (LCD) according to an embodiment of the present invention.
Figure 2:
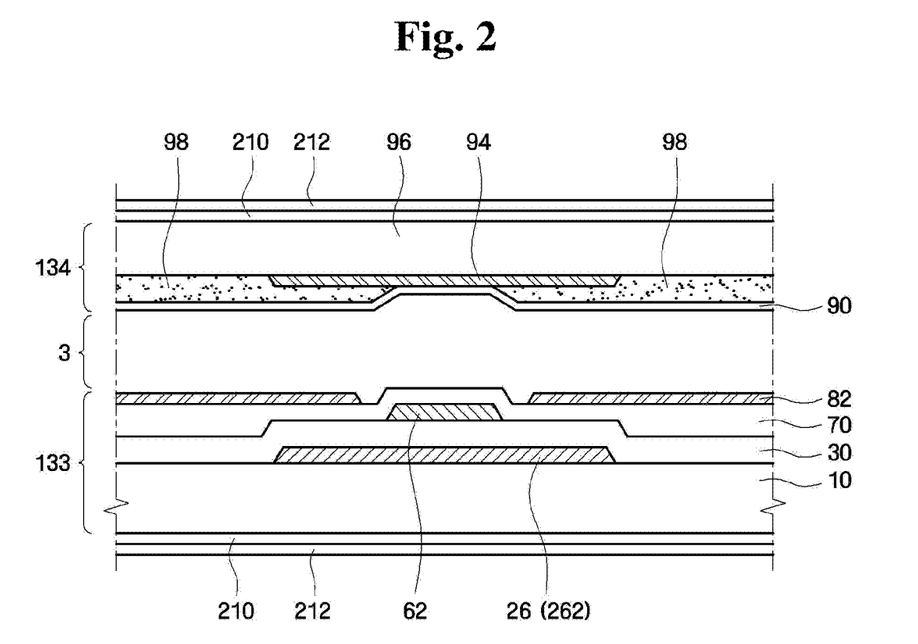
FIG. 2 is an exemplary cross-sectional view of the LCD taken along the line II-II' of FIG. 1.

FIG. 1 is an exemplary layout diagram of an LCD according to an embodiment of the present invention. FIG. 2 is an exemplary cross-sectional view of the LCD taken along the line II-II' of FIG. 1.

Referring to FIGS. 1 and 2, the LCD according to the present embodiment includes a first display panel 133, a second display panel 134 facing the first display panel 133, and a liquid crystal layer 3 interposed between the first and second display panels 133 and 134. The LCD further includes a compensation film 210 and a polarizing film 212 sequentially disposed on each of a lower surface of the first display panel 133 and an upper surface of the second display panel 134.

The first display panel 133 includes a first substrate 10, a thin-film transistor (TFT) 300 formed on the first substrate 10, a passivation layer 70 formed on the TFT 300, and a pixel electrode 82 electrically connected to the TFT 300. The first substrate 10 may be a transparent insulating material such as glass.

The TFT 300 is disposed at an intersection of a gate line 22 with a data line 62. The gate line 22 extends in a first direction, and the data line 62 is insulated from the gate line 22 and extends in a second direction to vertically intersect the gate line 22. The gate line 22 and the data line 62 adjacent to each other define each pixel region. When a gate signal is transmitted to the gate line 22, a data signal is transmitted from the data line 62 to the pixel electrode 82. The TFT 300 includes a gate electrode 326, a gate-insulating film 30, a semiconductor layer 340, an ohmic contact layer (not shown), a source electrode 365, and a drain electrode 366.

The gate electrode 326 is formed on the first substrate 10 and protrudes from the gate line 22. The gate electrode 326 switches a charge-transporting channel of the semiconductor layer 340 on or off by transmitting a gate signal to the TFT 300. The gate line 22 and the gate electrode 326 (hereinafter collectively referred to as a "gate wiring") may comprise aluminum (e.g., aluminum and/or an aluminum alloy), silver (Ag) (e.g., silver and/or a silver alloy), copper (Cu) (e.g., copper and/or a copper alloy), molybdenum (Mo) (e.g., molybdenum and/or a molybdenum alloy), chrome (Cr), titanium (Ti) or tantalum (Ta).

A storage wiring 26 may be made of the same material as the gate wiring and formed on the first substrate 10 to be in the same plane as the gate line 22. Alternatively, the storage wiring 26 may be made of a transparent material such as indium tin oxide (ITO) or indium zinc oxide (IZO), insulated from the gate line 22, and formed on or under the gate line 22. Referring to FIG. 1, the storage wiring 26 may include a first storage electrode 261, a second storage electrode 262, and a storage line 263. The storage line 263 is connected to the first and second storage electrodes 261 and 262. Each of the first and second storage electrodes 261 and 262 extends in the second direction to be parallel to the $m^{th}$ or $(m+1)^{th}$ data line 62 shown in FIG. 1. Since each of the first and second storage electrodes 261 and 262 is wider than the data line 62, it may cover at least part of the data line 62 or completely cover the data line 62.

A common voltage, which is a reference for a data signal voltage, may be applied to the storage wiring 26. Each of the first and second storage electrodes 261 and 262 is overlapped by the pixel electrode 82, which is formed in a corresponding pixel region. Each of the first and second storage electrodes 261 and 262 may be located at an end of a storage capacitor, which maintains a desired amount of charge in the pixel electrode 82. When a gate-on signal is changed to a gate-off signal, each of the first and second storage electrodes 261 and 262 may inhibit a drop in a kickback voltage of the pixel electrode 82.

As noted above, the common voltage is applied to the storage wiring 26. However, the present invention is not limited to cases where the common voltage is applied to only the storage wiring, and the storage wiring 26 may a floating electrode as well. In other words, even when no voltage is applied to the storage wiring 26, it is possible to obtain substantially the same action and effect as when the common voltage is applied to the storage wiring 26.

Referring to FIGS. 1 and 2, the first and second storage electrodes 261 and 262 may be located at left and right boundaries of the pixel electrode 82, respectively, with respect to a centerline of the pixel electrode 82, which extends in the second direction. The pixel electrode 82 may overlap the first and second storage electrodes 261 and 262. The gate-insulating film 30 and the passivation layer 70 are interposed between the first and second storage electrodes 261 and 262 and the pixel electrode 82 to form the storage capacitor. The storage line 263 connects the first and second storage electrodes 261 and 262 to each other. The storage line 263 electrically connects all storage wirings 26 of the first display panel 133 and applies the same common voltage to them. The structure of the storage line 263 can be modified in various ways in view of an aperture ratio.

The gate-insulating film 30 is formed on the gate electrode 326 or the gate line 22. The gate-insulating film 30 may comprise an insulating material such as silicon nitride ($SiN_x$) or silicon oxide ($SiO_x$).

The semiconductor layer 340 is disposed on the gate-insulating film 30 and made of hydrogenated amorphous silicon or polycrystalline silicon. In FIG. 1, the semiconductor layer 340 is island-shaped. However, the present invention is not limited thereto, and the semiconductor layer 340 may have various shapes. For example, the semiconductor layer may have an elongated linear shape.

The ohmic contact layer is formed on the semiconductor layer 340 and reduces electrical resistance between the semiconductor layer 340 and the source electrode 365 and between the semiconductor layer 340 and the drain electrode 366. The ohmic contact layer may be made of a material such as silicide or n+ hydrogenated amorphous silicon doped with n-type impurities in high concentration.

The source electrode 365 and the drain electrode 366 are formed on the ohmic contact layer and electrically connected to the data line 62 and the pixel electrode 82, respectively. The source electrode 365 overlaps at least part of the semiconductor layer 340, and the drain electrode 366 faces the source electrode 365 with respect to the gate electrode 326 and overlaps at least part of the semiconductor layer 340.

The passivation layer 70 is formed on the first substrate 10 and the TFT 300. The passivation layer 70 may comprise an inorganic material such as silicon nitride or silicon oxide, an organic material having photosensitivity and superior planarization characteristics, or a low-k dielectric material formed by plasma enhanced chemical vapor deposition (PECVD), such as a combination of amorphous silicon, carbon and oxygen (a-Si:C:O) or a combination of amorphous silicon, oxygen and fluorine (a-Si:O:F).

The pixel electrode 82 is formed on the passivation layer 70 in a pixel region and delivers a data signal from the data line 62 to the liquid crystal layer 3 in response to a gate signal. The pixel electrode 82 is electrically connected to the drain electrode 366 by a contact hole 72 formed in the passivation layer 70. The pixel electrode 82 may be made of a transparent conductor, such as ITO or IZO, or a reflective conductor such as aluminum.

Although not shown in the drawings, an alignment film may be formed on the pixel electrode 82 to align the liquid crystal layer 3.

Referring to FIG. 2, the second display panel 134 faces the first display panel 133 and includes a second substrate 96, a black matrix 94, a color filter 98, and a common electrode 90. Like the first substrate 10, the second substrate 96 may be a transparent insulating material such as glass.

The black matrix 94 is disposed on the second substrate 96 and prevents the leakage of light. Specifically, the black matrix 94 may cover the gate line 22, the data line 62, and a portion of the TFT 300 of the first display panel 133.

The color filter 98 may correspond to each pixel electrode 82 and be disposed on a portion of the second substrate 96 and a portion of the black matrix 94. The color filter 98 may be a red, green or blue filter.

The common electrode 90 is formed on the color filter 98 and the black matrix 94 and applies a voltage corresponding to a data signal to the liquid crystal layer 3, together with the pixel electrode 82. The common electrode 90 may be formed as a single electrode corresponding to a plurality of pixels.

Although not shown in the drawing, an alignment film may be formed on the common electrode 90 to align the liquid crystal layer 3.

The polarizing films 212 are disposed on the lower surface of the first display panel 133 and the upper surface of the display panel 134, respectively, to polarize light. The polarizing films 212 may have polarization axes (or transmission axes) orthogonal to each other. In addition the respective polarization axes of the polarizing films 212 may be at 45 or 135 degrees to a rubbing direction of the alignment film.

Each of the compensation films 210 is disposed between the first display panel 133 and one of the polarizing films 212 or between the second display panel 134 and the other one of the polarizing films 212. The compensation films 210 enhance a viewing angle of the LCD. Each of the compensation films 210 may be a liquid crystal polymer compensation film formed by the hybrid alignment of a discotic liquid crystal layer. For example, the compensation films 210 may be wide view (WV) films manufactured by Fujifilm Corporation.

The liquid crystal layer 3 is interposed between the first display panel 133 and the second display panel 134. The liquid crystal layer 3 changes light transmittance depending upon the voltage applied between the pixel electrode 82 and the common electrode 90.

In the LCD according to the present embodiment, each of the first and second storage electrodes 261 and 262 are insulated from the $m^{th}$ or $(m+1)^{th}$ data line 62 with the gate-insulating film 30 interposed therebetween.

Each of the first and second storage electrodes 261 and 262 is wider than the data line 62 and the black matrix 94, which is formed on the second substrate 96. Thus, each of the first and second storage electrodes 261 and 262 can block a part of the light incident on the first substrate 10 from proceeding toward a gap between the pixel electrode 82 and the data line 62. When the first and second storage electrodes 261 and 262 are structured as described above, the width of the black matrix 94, which blocks light from proceeding toward outside a pixel region, can be reduced. Alignment errors made when the first and second substrates 10 and 96 are adhered to each other may change the position of the black matrix 94, thereby causing defects due to the lateral leakage of light. However, the above structures of the first and second storage electrodes 261 and 262 according to the present invention can prevent lateral leakage of light resulting from alignment errors.

In this regard, the width of the black matrix 94 in the LCD according to the present embodiment can be reduced without taking alignment errors into consideration. Accordingly, a portion of a pixel region through which light passes is increased, leading to a higher aperture ratio. Moreover, each of the first and second storage electrodes 261 and 262 functioning as light-blocking layers can reduce the gap between the data line 62 and the pixel electrode 82, thereby increasing the aperture ratio and transmittance of the pixel region.

However, in the above pixel structure according to the present embodiment, the data line 62 is disposed adjacent to each of the first and second storage electrodes 261 and 262. Thus, parasitic capacitance $C_{sd}$ (not shown) may be generated between the data line 62 and each of the first and second storage electrodes 261 and 262. This parasitic capacitance $C_{sd}$ may delay a data signal that is to be applied to the data line 62, in which case the pixel electrode 82 located at an end of the data line 62 may not be fully charged. As a result, the display quality of the LCD may deteriorate. For example, color omission may occur.

Therefore, to prevent the deterioration of display quality resulting from the signal delay, a black driving voltage $V_b$ applied from an external driving integrated circuit (IC) to the data line 62 in a normally white mode is typically set higher than 6 V. However, a higher black driving voltage $V_b$ not only increases power consumption of the LCD but also causes the driving IC to generate heat.

These problems of the LCD having a high aperture ratio and structure that facilitates the transmittance of light can be overcome by using a liquid crystal composition which does not degrade display quality of the LCD even when driven at a low voltage. The liquid crystal composition uses a low driving voltage, and has a fast response time when compared with other comparative or commercially available compositions. Hereinafter, the composition and material properties of the liquid crystal composition will be described in detail.

The liquid crystal composition may include about 20 to about 60% by weight of a polar liquid crystal compound, about 25 to about 40% by weight non-polar liquid crystal compound, and a balancing agent. The polar liquid crystal compound may comprise liquid crystals having positive dielectric anisotropy. In a twisted nematic (TN) mode, a voltage applied between the pixel electrode 82 of the first substrate 10 and the common electrode 98 of the second substrate 96 causes a long axis of the polar liquid crystal compound to be aligned in the direction of an electric field. In other words, the polar liquid crystal compound is aligned almost perpendicular to the first and second substrates 10 and 96.

The polar liquid crystal compound may be added to the liquid crystal composition, which is interposed between the first and second display panels 133 and 134, in an amount of about 20 to about 60% by weight based on the weight of the liquid crystal composition. When the polar liquid crystal compound having positive dielectric anisotropy is added in large amounts, the black driving voltage $V_b$ applied from an external source is reduced, leading to a reduction in power consumption of the LCD. In this case, however, the polar liquid crystal compound is increased in polarity and significantly affected by an electric field applied thereto. This causes the rotational viscosity of the liquid crystal composition to be increased, thereby increasing the response time of the liquid crystals. Therefore, the polar liquid crystal compound may be added in an amount of about 60% by weight or less to prevent an increase in response time. On the other hand, the polar liquid crystal compound added in very small amounts increases the black driving voltage $V_b$, resulting in a sharp increase in power consumption. Therefore, the polar liquid crystal compound may be added in an amount of about 20% or more by weight based on the weight of the liquid crystal composition.

The polar liquid crystal compound according to the present embodiment includes a first polar liquid crystal compound, a second polar liquid crystal compound, and a third polar liquid crystal compound.

Specifically, the polar liquid crystal compound according to the present embodiment may include the first polar liquid crystal compound represented by formula (I) below in an amount of about 20% or less by weight based on the weight of the liquid crystal composition.

(I)

where R1 may be an alkyl group, an alkoxy group, or an alkenyl group having about 2 to about 15 carbon atoms. Since the first polar liquid crystal compound represented by formula (I) has a relatively higher value of dielectric anisotropy than the other polar liquid crystal compounds, it, even when added in very small amounts, greatly contributes to the dielectric anisotropy of the liquid crystal composition. Thus, the first polar liquid crystal compound should be added in no more than a predetermined amount in weight percent ("wt %"). According to the present embodiment, the first polar liquid crystal compound may be added in an amount of about 20% or less by weight based on the weight of the liquid crystal composition.

The polar liquid crystal compound according to the present embodiment may include the second polar liquid crystal compound having high dielectric anisotropy and represented by at least one of formulas (II), (III), and (IV) below in an amount of about 20% or less by weight based on the weight of the liquid crystal composition.

In formulas (II), (III) and (IV), each of R2, R3, and R4 may independently be an alkyl group, an alkoxy group, or an alkenyl group having about 2 to about 15 carbon atoms. The second polar liquid crystal compound has a high value of dielectric anisotropy and, even when added in small amounts, significantly increases the overall dielectric anisotropy of the liquid crystal composition Accordingly, the second polar liquid crystal compound can reduce the driving voltage and thus solve the problems of a TN mode structure (a TN mode LCD) having a high aperture ratio, such as an increase in power consumption and heat generation by a driving IC.

The polar liquid crystal compound according to the present embodiment may include the third polar liquid crystal compound represented by formula (V) below.

where R5 may be an alkyl group, an alkoxy group, or an alkenyl group having about 2 to about 15 carbon atoms.

The polar liquid crystal compound including the first through third polar liquid crystal compounds as described above may be added to the liquid crystal composition in an amount of about 20 to about 60% by weight based on the weight of the liquid crystal composition.

If the amount of the polar liquid crystal compounds is controlled as described above, dielectric anisotropy $\Delta\in$ of the liquid crystal composition may have a value of about 5.5 to about 7.7. In this case, the black driving voltage $V_b$ applied to maintain the display quality of the LCD may be about 4.0 to about 5.0 V. That is, the LCD according to the present embodiment can be driven at a lower voltage than about 6 V, which is generally applied to TN-mode liquid crystals used in conventional monitors.

As described above, a greater amount of the polar liquid crystal compound increases the rotational viscosity of the liquid crystal composition, thereby slowing down response time of liquid crystals. In addition, the slowdown in response time degrades the display quality of the LCD. For example, afterimages may be formed, or motion blur may be found in moving images reproduced at high speed. To address these problems, a non-polar liquid crystal compound having very low dielectric anisotropy may be used to reduce the rotational viscosity of the liquid crystal composition.

The liquid crystal composition according to the present embodiment may include the non-polar liquid crystal compound represented by formula (VI) below in an amount of about 25 to about 40% by weight based on the weight of the liquid crystal composition.

where each of R6 and R6' may independently be an alkyl group, an alkoxy group, or an alkenyl group having about 2 to about 15 carbon atoms.

The rotational viscosity of the liquid crystal composition including the non-polar liquid crystal compound may have a value of about 40 to about 60 megapascals ("mPa·s"), so that fast response time characteristics can be satisfied.

The liquid crystal composition according to the present embodiment may further include a balancing agent to smoothly mix the polar liquid crystal compound with the non-polar liquid crystal compound. The balancing agent may be represented by at least one of formulas (VII) and (VIII) below.

In formulas (VII) and (VIII), each of R7 and R8 may independently be an alkyl group, an alkoxy group, or an alkenyl group having about 2 to about 15 carbon atoms.

The liquid crystal composition prevents the display quality (such as viewing angle, contrast ratio, transmittance, and response time) of the LCD from being degraded.

The liquid crystal composition according to the present embodiment may have a pitch of about 30 to about 90 micrometers (μm) and a refractive anisotropy ("Δn") of about 0.10 to about 0.15. A cell gap, i.e., the distance between the first and second substrates 10 and 96, may be about 2.5 to about 4.0 micrometers (μm) in view of yield and response time. In addition, a ratio (K11/K33) of a splay elastic coefficient (K11) to a bend elastic coefficient (K33) may be about 0.5 to about 1.2. The splay elastic coefficient (11) may be about 10.0 to about 15.0, and the bend elastic coefficient (K33) may be about 11.0 to about 16.0.

In the following embodiments of the present invention, material properties and response time of a liquid crystal composition and upper and lower viewing angles of an LCD including the liquid crystal composition were measured by varying the amount (wt %) of each of polar and non-polar liquid crystal compounds included in the liquid crystal composition The results are shown in Table 1 below, together with those of Comparative examples 1 and 2. In Comparative examples 1 and 2, characteristics of a conventional liquid crystal composition, which is used in LCDs having a high aperture ratio and transmittance structure, and those of an LCD including the conventional liquid crystal composition were measured.

TABLE 1

|  | Comparative example 1 | Embodiment 1 | Embodiment 2 | Comparative example 2 | Embodiment 3 | Embodiment 4 |
| --- | --- | --- | --- | --- | --- | --- |
| Pitch of Liquid crystal (μm) | 70 | 70 | 70 | 55 | 55 | 55 |
| Dielectric anisotropy | 5.3 | 5.7 | 5.9 | 5.1 | 5.5 | 5.7 |
| Rotational viscosity (mPa·s) | 57 | 57 | 56 | 57 | 56 | 57 |
| Refractive index | 0.115 | 0.114 | 0.115 | 0.117 | 0.116 | 0.116 |
| Cell gap (μm) | 3.5 | 3.5 | 3.5 | 3.5 | 3.5 | 3.5 |
| $T_{ni}$ (° C.) | 74.5 | 74 | 73.5 | 74.2 | 74.4 | 74.6 |
| Response time (ms) | 4.8 | 5.3 | 5.3 | 5.0 | 5.2 | 5.5 |

TABLE 1-continued

| | Comparative example 1 | Embodiment 1 | Embodiment 2 | Comparative example 2 | Embodiment 3 | Embodiment 4 |
|---|---|---|---|---|---|---|
| Upper/lower viewing angle (degree) | 80/80 | 65/80 | 80/80 | 80/80 | 60/80 | 70/80 |

In Table 1 above, the black driving voltage $V_b$ was 4.8 V in Embodiments 1 through 4 and 5.5 V in Comparative examples 1 and 2. In addition, "$T_{ni}$," indicates a transition temperature at which a nematic liquid crystal composition becomes an isotropic material.

It can be understood from Table 1 that Embodiment 2 is closely equivalent to Comparative examples 1 and 2 in terms of response time and viewing angle characteristics. That is, even when a low driving voltage is used, a liquid crystal composition of Embodiment 2 ensures substantially the same display characteristics as when a high driving voltage is used.

Figure 3:
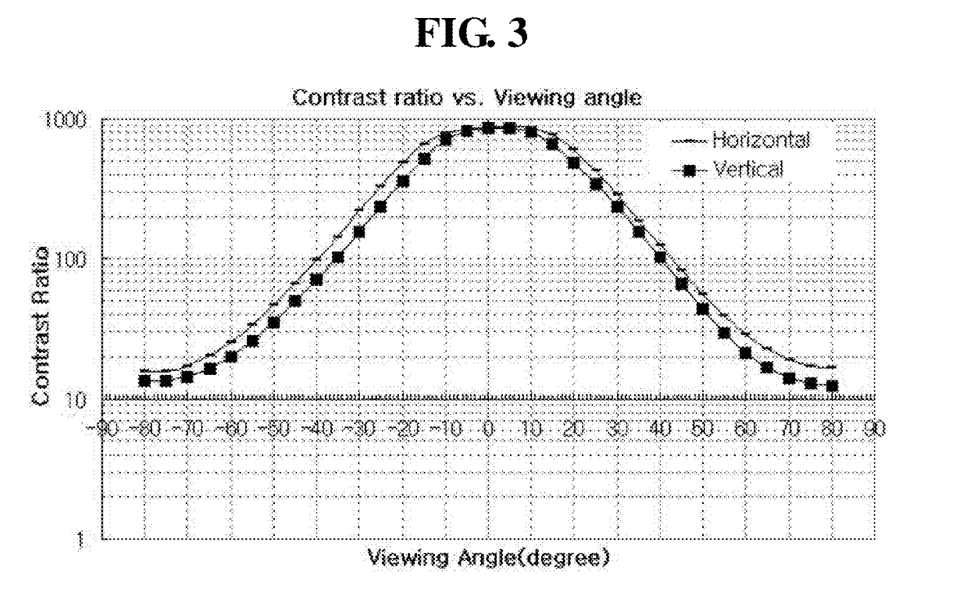
FIG. 3 is a graph of contrast ratio versus viewing angle.

FIG. 3 is a graph illustrating vertical and horizontal viewing angle characteristics of Embodiment 2. Referring to FIG. 3, Embodiment 2 exhibits good viewing angle characteristics, that is, viewing angles of 80 degrees or more in all directions (right, left, up, and/or down).

Figure 4:
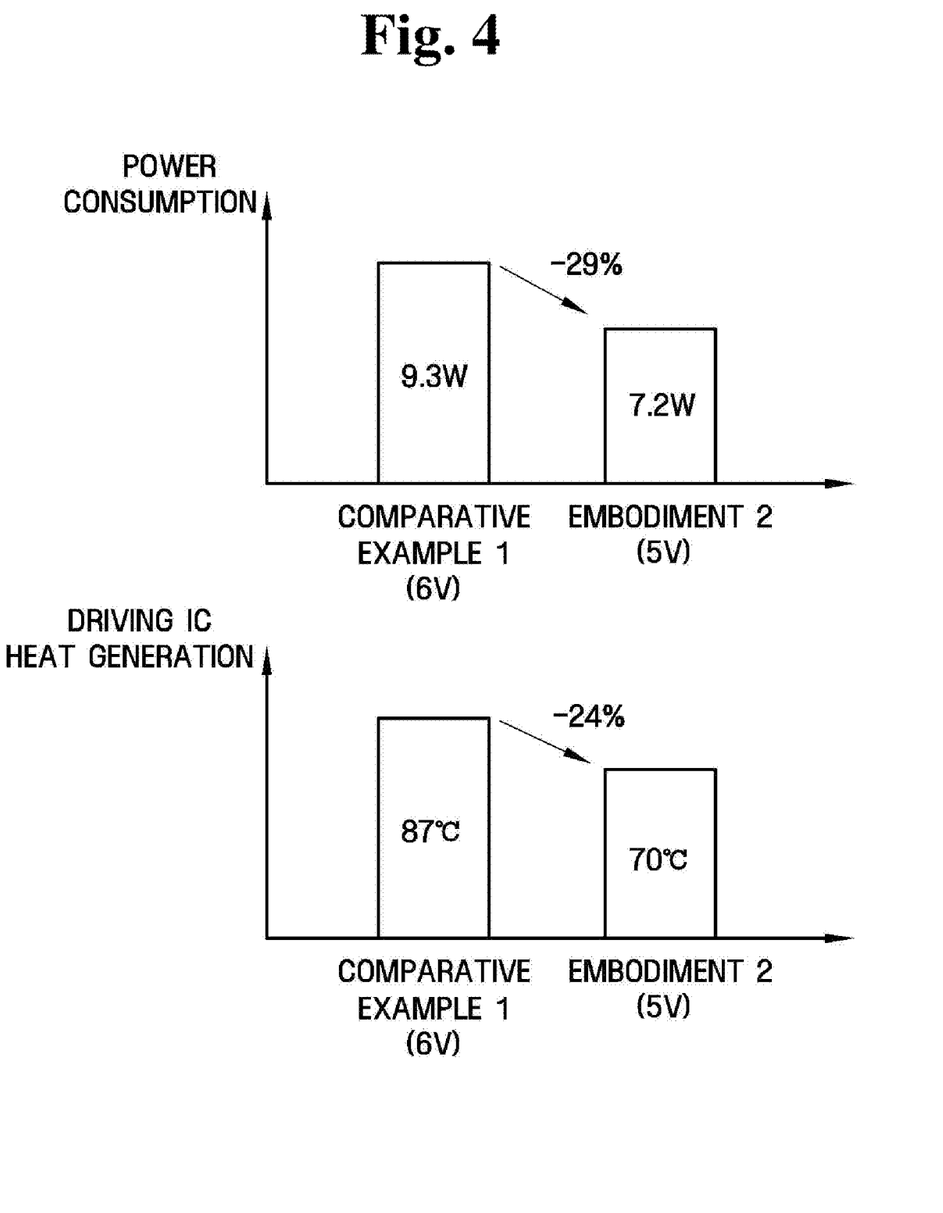
FIG. 4 is a graph illustrating power consumption and heat generation characteristics of the present invention.

A driving voltage of 5 V was applied to an LCD including the liquid crystal composition of Embodiment 2 while a driving voltage of 6 V was applied to an LCD including the liquid crystal composition of Comparative example 1. In this state, power consumption and heat generation characteristics of the LCDs were measured, and results are illustrated in FIG. 4. Referring to FIG. 4, a 1 V drop in the driving voltage results in 29 and 24% reductions in the power consumption and heat generation characteristics, respectively. Thus, the problems of the TN mode structure having a high aperture ratio, that is, high power consumption and heat generation by a driving IC, can be reduced.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. An LCD comprising:
a first substrate;
a pixel electrode, which is formed in a pixel region defined by a gate line and a data line intersecting each other on the first substrate;
a storage electrode overlapping the pixel electrode to form a storage capacitor;
a second substrate separated from the first substrate and facing the first substrate; and
a liquid crystal composition interposed between the first substrate and the second substrate,
wherein the liquid crystal composition comprises a first polar liquid crystal compound and a second polar liquid crystal compound, each in an amount of about 20% or less by weight based on a weight of the liquid crystal composition, and the storage electrode is overlapped by the data line to be parallel to the data line and is wider than the data line,
wherein the first polar liquid crystal compound is represented by and the second polar liquid crystal compound is represented by at least one of where each of R1, R2, and R3, and R4 independently is an alkyl group, an alkoxy group, or an alkenyl group having about 2 to about 15 carbon atoms.

2. The LCD of claim 1, wherein the liquid crystal composition further comprises a third polar liquid crystal compound, and the sum of the first through third polar liquid crystal compounds is about 20 to about 60% by weight based on the weight of the liquid crystal composition, wherein the third polar liquid crystal compound is represented by where R5 is an alkyl group, an alkoxy group, or an alkenyl group having about 2 to about 15 carbon atoms.

3. The LCD of claim 2, wherein the liquid crystal composition further comprises a non-polar liquid crystal compound in an amount of about 25 to about 40% by weight based on the weight of the liquid crystal composition, wherein the non-polar liquid crystal compound is represented by where each of R6 and R6' independently is an alkyl group, an alkoxy group, or an alkenyl group having about 2 to about 15 carbon atoms.

4. The LCD of claim 1, wherein the liquid crystal composition has a pitch of about 30 to about 90 micrometers.

5. The LCD of claim 1, wherein the liquid crystal composition has a refractive anisotropy of about 0.10 to about 0.15 and a cell gap of about 2.5 to about 4.0 micrometers, wherein the cell gap is defined as a distance between the first display panel and the second display panel.

6. The LCD of claim 1, wherein the liquid crystal composition has a dielectric anisotropy of about 5.5 to about 7.5.

7. The LCD of claim 1, wherein the liquid crystal composition has a rotational viscosity of about 40 to about 60 megapascals.

8. The LCD of claim 1, wherein a black driving voltage applied to the liquid crystal composition is about 4.0 to about 5.0 volts.

9. The LCD of claim 1, wherein a ratio of a splay elastic coefficient to a bend elastic coefficient is about 0.5 to about 1.2.

10. The LCD of claim 9, wherein the splay elastic coefficient is about 10.0 to about 15.0, and the bend elastic coefficient is about 11.0 to about 16.0.

* * * * *